Jan. 28, 1930.   G. W. INGLE   1,744,898
MOWING THRASHER
Filed Jan. 4, 1927   3 Sheets-Sheet 1
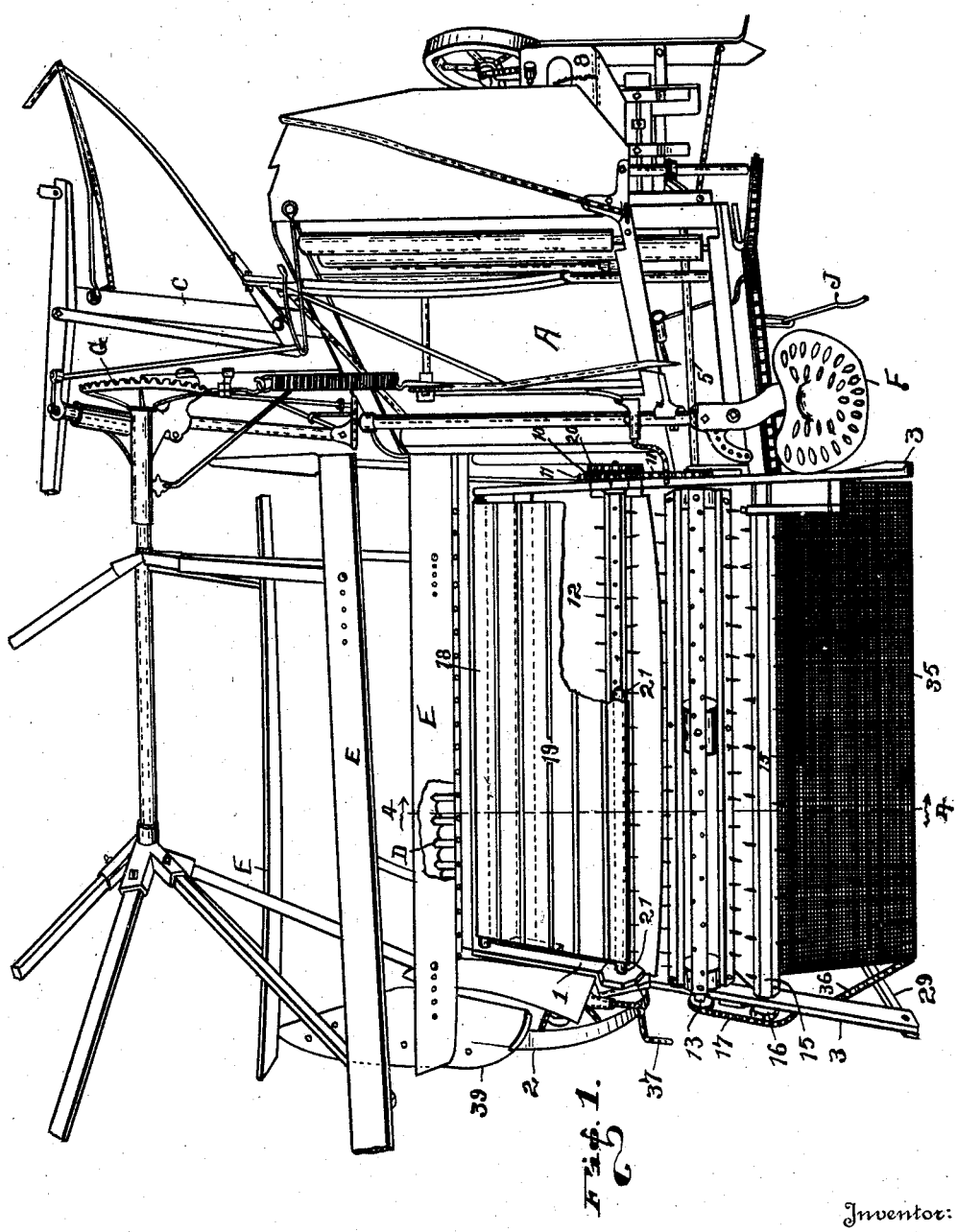

Jan. 28, 1930.  G. W. INGLE  1,744,898
MOWING THRASHER
Filed Jan. 4, 1927  3 Sheets-Sheet 2
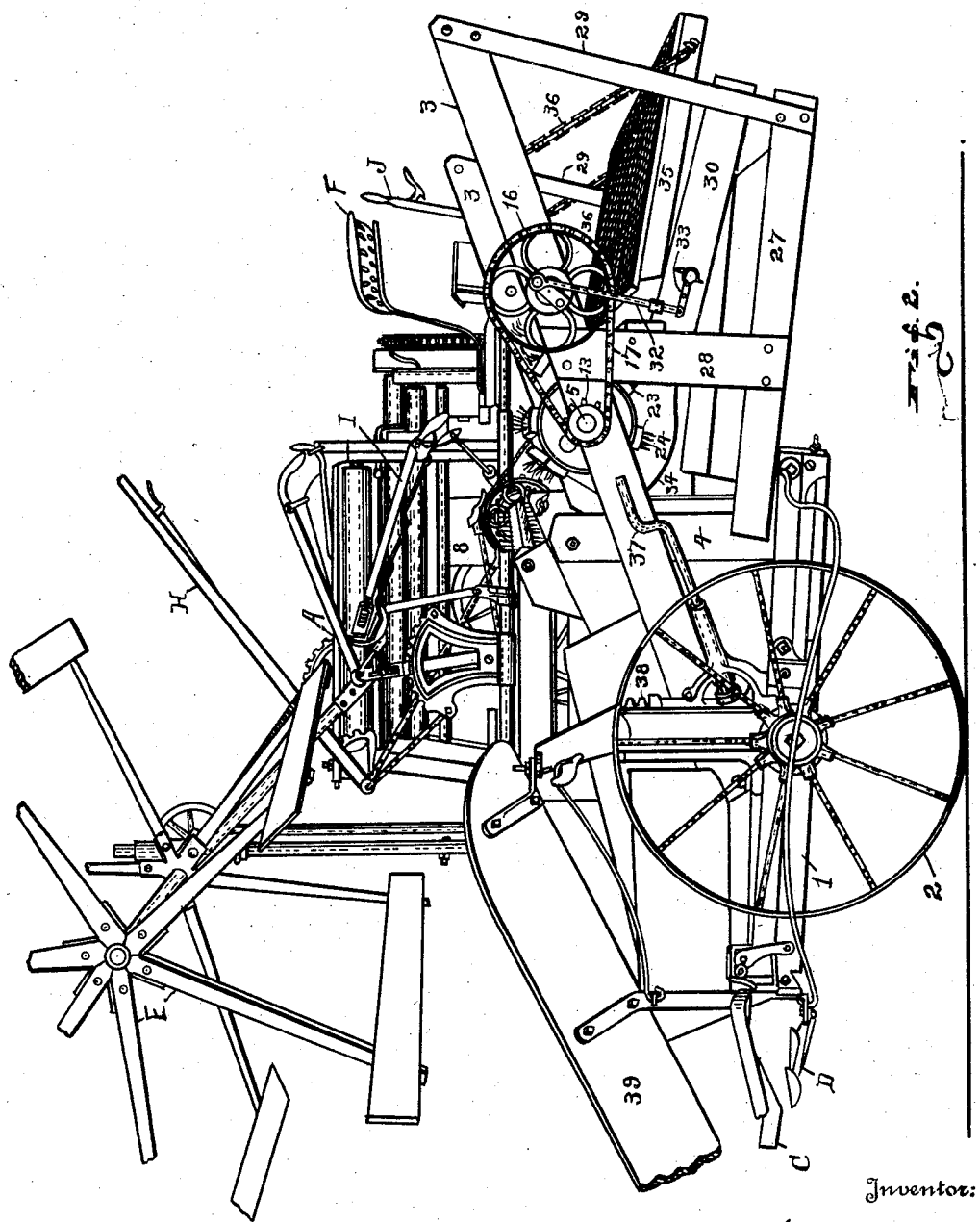
Inventor:
George W. Ingle;
By Robert W. Caudle,
Attorney.

Jan. 28, 1930.  G. W. INGLE  1,744,898
MOWING THRASHER
Filed Jan. 4, 1927  3 Sheets-Sheet 3
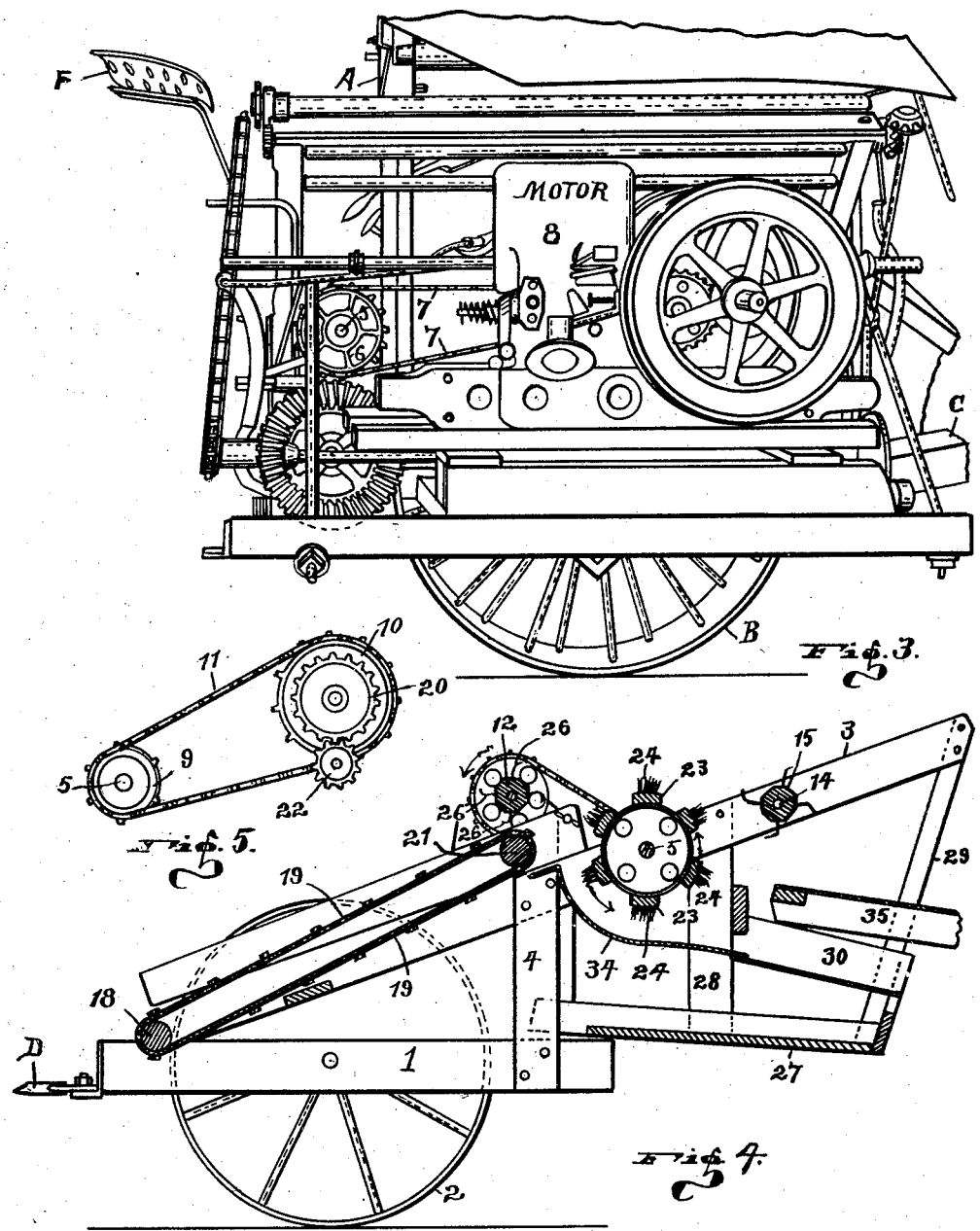
Inventor:
George W. Ingle;
By Robert W. Randle,
Attorney.

Patented Jan. 28, 1930

1,744,898

UNITED STATES PATENT OFFICE

GEORGE W. INGLE, OF RANDOLPH COUNTY, INDIANA

MOWING THRASHER

Application filed January 4, 1927. Serial No. 158,996.

The object of my present invention, broadly speaking, is to provide means for cutting and thrashing certain kinds of crops, such for instance as clover, and more particularly sweet-clover, whereby the standing plants will be cut or moved and then the seeds will be thrashed out immediately, whereby the hay will be left on the ground where it has grown and the seeds will be carried along with the machine, whereby at certain intervals it can be taken from the machine and placed in suitable containers. The machine being of such construction that none of the seed will be lost.

My invention can be built as a complete self-contained machine, with all of the parts made especially therefor; or it can be made as an attachment for parts of, or substitute for other parts of another machine. That is to say,—the binding mechanism of an ordinary self-binder for wheat may be removed from the chassis and the cutting mechanism thereof, after which my invention may be installed in place thereof, thereby utilizing the chasis and the cutting mechanism of the self-binder for part of my attachment.

This latter arrangement I have shown in the drawings in the present instance, and the description will relate entirely thereto. Also in the drawings I have shown a power motor, so mounted as to be carried by the chassis of the machine and geared to operate my invention independently of the means for propelling the entire machine, which latter, in this instance, is shown as animal power. However it is to be understood that the machine may be propelled by a motor carried thereby, or by a tractor attached thereto. Also it should be understood that the motor for the independent operation of my mechanism may be replaced by means whereby it will be operated by the power driving propeller stated.

My invention is fully shown in the accompanying drawings, in which—Figure 1 is a top plan view of my invention and of the carrying machine to which it is attached and by which it is carried. Figure 2 is a left-hand side perspective view of the same. Figure 3 is a right-hand side elevation of the same. Figure 4 is a central cross section of my invention, as taken on the line 4—4 of Fig. 1. And Figure 5 is a detail view of the mechanism for operating the conveyor.

Similar indices denote like parts throughout the several views.

In order that the construction, the operation, and the several advantages of my invention may be the more fully understood and appreciated, I will now take up a detailed description thereof, in which I will set forth the same as comprehensively as I may. The carrying machine with which my invention is to be combined, which machine in this instance is a self-binder with the binding mechanism removed, comprises a body A which includes the several parts thereof and not any particular element. Said machine includes the main drive or ground wheels B on which it is adapted to be propelled over the ground by animals hitched into connection with the tongue C.

Connected to the body A, and operative by the mechanism thereof, is the usual cutting or mowing mechanism D, which is located near the ground, parallel therewith, and extends to the left from said machine, and it includes the ordinary sliding and alternating sickle mechanism used with mowing machines. F denotes the driver's seat.

Letter E denotes the usual reel, also propelled automatically by the operation of said machine, and by which the plants as they are cut are caused to fall rearward upon the conveyor, hereinafter explained. All of said parts, and other parts which may be hereinafter referred to by letters of reference, are old or of ordinary construction, and I make no claim thereto, neither am I to be limited to their specific construction as shown or specified.

The invention proper is denoted by numerial and includes a horizontal base frame 1, which extends back from the cutting mechanism D, and extends across the full length thereof, with its inner or right-hand end secured to the machine, and its outer end is supported by the ground wheel 2, which latter also supports the outer end of the cutting mechanism D.

Secured to the forward end of the frame 1 and extending upward and rearward at an angle beyond the frame 1, is the main frame 3.

Standards 4 extend upward from the rear end of the frame 1 and support the frame 3, substantially as shown.

Extending horizontally across through the side members of the frame 3 is the main shaft 5 of my device, whose inner portion extends beyond the frame 3, through the machine, and its right-hand end is provided with the sprocket wheel 6, over which operates the sprocket chain 7, which chain also operates over a sprocket pinion (not shown) which is secured on a shaft which is revolved by the motor 8. Secured on the central portion of the shaft 5, adjoining the right hand side of the inner member of the frame 3, is a small sprocket wheel 9. Numeral 12 denotes a roller which extends between the two side members of the frame 3, and it is pivoted therein. Secured on the inner pivot of the roller 12 is a sprocket wheel 10, and a sprocket chain 11 connects the wheels 9 and 10. Also secured on said inner end pivot of the roller 12 is a gear wheel 20. Also extending between the sides of the frame 3 is a roller 21, located parallel with and is directly below the roller 12, and its projecting inner pivot is provided with a gear wheel 22 which meshes with the wheel 20.

A sprocket-wheel 13 is secured on the outer end of the shaft 5.

At the rear of the shaft 5, parallel therewith, is the shaft 14, which is journaled in the sides of the frame 3, with a roller 15 secured therearound, said roller extends between the sides of the frame 3. Secured on the outer projecting end of the shaft 14 is the large sprocket-wheel 16. Connecting the wheels 13 and 16 is the sprocket-chain 17.

Mounted in the lower forward portion of the frame 3, between the side members thereof, and parallel with the roller 21, is the roller 18. Connecting the rollers 18 and 21 is the endless conveyor belt or apron 19.

Secured on the shaft 5 and extending between the side members of the frame 3 is a reel, including the slats 23, with a plurality of spikes or prongs 24 projecting radially throughout the length thereof. Also a plurality of rows of curved spikes or blades 25 extend out from around the roller 15, as is shown in Fig. 4.

Also a plurality of rows of curved teeth or blades 26 extend radially from around the roller 12, substantially as shown.

Numeral 27 designates a container or tray, which extends rearward from the standards 4, and it is suspended from the frame 3 by means of front standards 28 and the rear standards 29.

Numeral 30 denotes a comparatively fine-mesh screen or sieve, the frame of which fits between the standards 28 and 29 on one side and like standards on the other side. The rear end of the sieve 30 rest, normally, on the frame of the tray 27, from which it extends upward and rearward to position between the standards 28, where it is suspended as follows: Carried by the wheel 16 is an eccentric comprising the wrist-pin 31 on which is mounted the upper end of the adjustable pitman 32. The lower end of said pitman is pivoted to the arm 33, the latter being secured to the side of the sieve 30. Extending from below the roller 21, underneath the drum on the shaft 5, to and overlapping the forward edge of the bottom of the sieve 30, is a sheet-metal seed saver or chute 34, by which the seeds falling therefrom will be carried or conducted onto the sieve 30.

Numeral 25 denotes the upper and coarser sieve, whose forward end normally rests on the sieve 30, and its rearward end is supported by the chains 26, and its rear end projects back beyond the sieve 30.

The device is adapted to be adjusted, up and down, by turning the crank 37, which operates a gear in connection with the rack 38.

Numeral 39 denotes a flaring guard, for guiding the falling stalks, as they are cut, into the conveyor 19.

Letter G denotes one of the gears by which the reel E is revolved automatically. Letters H, I and J denote certain of the usual control levers, which are within reach of the driver on the seat F.

*Operation*

In practice it is to be observed that when arranged substantially as shown that the machine may be manipulated the same as a self-binder. Now as the machine is drawn over the ground in a field of standing sweet-clover, for instance, the cutting mechanism being in operation, it is evident that as the clover is cut it will fall back upon the conveyor 19, the upper side of which is then travelling upward and rearward over the rollers 18 and 21, thereby carrying the clover to where it will be engaged by the teeth 26 and broken up and thrown back and down against the reel on the shaft 5, by which it will be further broken up and the seeds thrashed out and separated therefrom by the teeth 24. The seeds and chaff falling onto the saver 34 and conducted onto the sieve 30, which latter will be in constant agitation by the pitman 32, whereby the seeds will be sifted through the sieve and will fall into the tray 27, and the chaff will finally fall from the rear end of the sieve 30 onto the ground. At the same time the straw or hay will be forced back onto the sieve 35, the chaff and seeds which might have been carried along with the straw passing down through the sieve 35 onto the sieve 30, and the straw will work back and fall off the rear end of the sieve 35 onto the ground.

After the desired amount of seed has accumulated in the tray 27 then the rear ends of the sieves 35 and 30 may be turned upward, thereby permitting one to have access to the interior of the tray 27 for removing the accumulated seeds.

It is not anticipated, however, that the product from the tray 27 will be entirely clean or free from chaff or dust, but it may later be run through a suitable fan-mill which will finish the cleaning process.

After the crop of clover has been disposed of, as set forth, then my attachment may be removed from the machine, the binding mechanism may then be replaced, and the machine will be ready to operate as a wheat cutter and binder as before.

I desire that it be understood that various changes may be made in the several details herein set forth, without departing from the spirit of my invention and without sacrificing any of the advantages thereof which are new and useful.

Having now fully shown and described my invention, what I claim and desire to secure by Letters Patent of the United States, is—

In combination with an ordinary self-binding machine with the binding mechanism removed; an attachment comprising a horizontal base frame extending back from the cutting mechanism of said machine and extending across the full length thereof and secured to the said machine, a main frame secured to the forward end of the base frame and projecting upwardly and rearward, standards supporting the rear end of the main frame, a motor carried by said machine, a main shaft operable by said motor, a rear roller extending between the side members of the main frame, a forward roller parallel with the rear roller and located at a distance therefrom, a reel secured on said shaft, a plurality of rows of curved spikes extending out from the forward roller, blades carried by the rear roller, a tray extending rearward from said standards and suspended from said frame, a sieve fitting between said standards with its rear end normally resting on said tray from which it extends upward and rearward, a seed saving chute for carrying seed to the seed saver, means for adjusting the device vertically, and means whereby said mechanism may be removed from the self binding machine and the self binding mechanism restored to its place, substantially as set forth.

In testimony whereof I have hereunto subscribed my name.

GEORGE W. INGLE.